(12) United States Patent  
Schlecht

(10) Patent No.: US 8,055,573 B2  
(45) Date of Patent: Nov. 8, 2011

(54) SYSTEM METHOD FOR MARKETING COMMODITY PRODUCTS ELECTRONICALLY

(75) Inventor: Larry Schlecht, Derby, KS (US)

(73) Assignee: Flint Hills Resources, L. P., Wichita, KS (US)

( * ) Notice: Subject to any disclaimer, the term of this patent is extended or adjusted under 35 U.S.C. 154(b) by 2350 days.

(21) Appl. No.: 10/892,390

(22) Filed: Jul. 15, 2004

(65) Prior Publication Data

US 2006/0015530 A1    Jan. 19, 2006

(51) Int. Cl.  
*G06Q 40/00* (2006.01)
(52) U.S. Cl. ........................................................ 705/37
(58) Field of Classification Search ...................... 705/37  
See application file for complete search history.

(56) References Cited

U.S. PATENT DOCUMENTS

| | | | |
|---|---|---|---|
| 6,115,698 | A | 9/2000 | Tuck et al. |
| 6,131,087 | A * | 10/2000 | Luke et al. ................ 705/26 |
| 6,405,204 | B1 | 6/2002 | Baker et al. |
| 6,473,744 | B1 | 10/2002 | Tuck et al. |
| 6,598,029 | B1 | 7/2003 | Johnson et al. |
| 2002/0023044 | A1 | 2/2002 | Cichanowicz |
| 2002/0046127 | A1 * | 4/2002 | Reding et al. ............. 705/26 |
| 2002/0049667 | A1 | 4/2002 | Navani et al. |
| 2002/0107782 | A1 * | 8/2002 | Greenberg et al. ......... 705/37 |
| 2002/0138400 | A1 | 9/2002 | Kitchen et al. |
| 2003/0018561 | A1 | 1/2003 | Kitchen et al. |
| 2003/0023540 | A2 | 1/2003 | Johnson et al. |

* cited by examiner

*Primary Examiner* — Lindsay M. Maguire  
(74) *Attorney, Agent, or Firm* — Vinson & Elkins, LLC

(57) ABSTRACT

A system and method of marketing commodity products over an internet connection, in which the product price is continuously correlated to a publicly traded exchange price and in which a customer may be notified if the product price reaches a previously selected target price set by the customer.

13 Claims, 7 Drawing Sheets

SYSTEM METHOD FOR MARKETING COMMODITY PRODUCTS ELECTRONICALLY

BACKGROUND OF THE INVENTION

Various methods have been described for the online buying or selling of energy products or commodities, however, these methods primarily involve offering an auction site where various products may be auctioned to bidders, or providing an exchange in which buyers and sellers may connect for transactions through a third party web site. U.S. Pat. No. 6,405,204 describes a system in which a database tracks company and market performance information and alerts a user when certain criteria are met. The present inventors are unaware, however, of any existing method of online marketing of commodity products in which the price is tied to an active exchange market and in which a user may be notified when the product price matches user set target price criteria.

SUMMARY

The present disclosure may be described in certain embodiments as a method of marketing commodity products electronically such as over an internet connection. A flow diagram of a preferred embodiment is shown in FIG. 1. The diagram indicates that a day deal customer or user requests to logon to the system and the system determines that the user is a valid customer and allows the login. A day deal administrator also logs into the system in order to manage the administrator price and other functions of the seller or marketer of the commodities. As used herein, the term "administrator" may be used to mean the person logged on and managing the on-line marketing operation, or it may mean a company that is marketing products to users or customers.

In preferred embodiments, after a user has been verified as a qualified user, the user is presented with a menu navigation tool with choices including customer preferences, edit target prices, and propose contract. Choosing "customer preferences" directs the user to a page in which the user selects preferences that may become part of that user's profile saved in a database maintained by the administrator's computer system. Among the choices a user may select is a list of locations or delivery terminals and the user selects which of the available locations he or she will have displayed for monitoring of pricing and possible contracts. In preferred embodiments, the customer profile also includes those locations for which a user is approved to take delivery of product. A user, thus, is only able to view those locations for which that user is approved. It is understood that a certain product, such as unleaded gasoline may be selected as the commodity product, and the user may select one or several locations where the user may take delivery of that particular product. The preferences are saved in the fuelwatch database as described. It is an aspect of the disclosure that the user may select more than one product to monitor and that a list of location preferences can be saved in the database for each product. In preferred embodiments, a user may change or modify the selected preferences at any time while the user is logged into the system. When the user logs on and has previously saved preferences for a product, the selected locations are displayed. When the locations for a selected product are displayed on a screen, the user may set or edit target prices for the selected commodity product for one or more displayed locations. The target price is defined as the price that the user either wants the opportunity to either beat (buy below) or exceed (to allow the customer to buy because he expects the price to move up). Typically the target price is the user's best alternative to buy for that day.

In the preferences section, the user may also indicate for which locations a notification should be triggered if the target price parameters are met. The user then sets the notification parameters or limits. A preferred embodiment also allows the user to set global notification parameters that would apply to all locations selected for notification, or the same or different notification parameters may be set for individual locations. It is understood that the system looks to individual limits first, and if none are found, then looks to global limits for a selected location.

For example, a user may select three locations for notification by selecting a tick box next to each location in the list. The user may then select parameters or limits for notification. Parameters for notification are limits above and/or below the user's selected target price. As the administrator's price moves throughout the trading day, it may match or pass one of the limits set by the user for a particular location, or a global limit. The system then notifies the user that his or her target price criteria has been met, or his or her target is "in the money."

As the commodity product is traded on an open exchange, such as the New York Mercantile Exchange, the administrator monitors the price components and determines an administrator's price for the product at each location, based on the exchange price and other factors for each location. This may be done manually or it may be automated. The administrator's price (referred to as FHR price in the Figures) is posted on the web site along with the target price parameters so the user can monitor the price moves during the day. It is understood by those of skill in the art that the trading day is the time during which the Exchange is open for active trading, or the trading day may be a set time period determined by the administrator. The online marketing system referred to herein as the day deal system is preferably active only during the trading day or some portion of the trading day to be determined by the administrator. It is also an aspect of the disclosure that in certain embodiments all target prices and product prices are valid for the day only and become invalid at the end of the trading day or at the close of business of the online marketing service, unless specifically extended by the administrator.

The administrator price and the customer target price are compared in the fuelwatch database and when the user's criteria are met, the user is automatically notified. Notification can be by email, and/or by an indicator that appears on the customer's screen when the customer is logged in to the system.

The user may propose a contract for product by selecting one or more locations for delivery, entering volume of product for each location and submitting these selections as a proposed contract. If the proposed contract is valid it is displayed in the proposed contract list. The user may then review his own proposed contracts and can cancel them prior to acceptance by the administrator. The administrator may view the contract and accept or reject it. The system then electronically notifies the customer of the acceptance or rejection of the contract. In preferred embodiments the user is notified both by email and by a message sent to his or her computer screen that the contract has been accepted or rejected.

Throughout this disclosure, unless the context dictates otherwise, the word "comprise" or variations such as "comprises" or "comprising," is understood to mean "includes, but is not limited to" such that other elements that are not explicitly mentioned may also be included. Further, unless the context dictates otherwise, use of the term "a" may mean a singular object or element, or it may mean a plurality, or one or more of such objects or elements.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 3 is an example of a screen used to set user preferences in a preferred embodiment.

FIG. 4 is an example of a screen for editing target prices in a preferred embodiment.

FIG. 6 is an example of a screen for proposing contracts in a preferred example.

DETAILED DESCRIPTION

Figure 1:
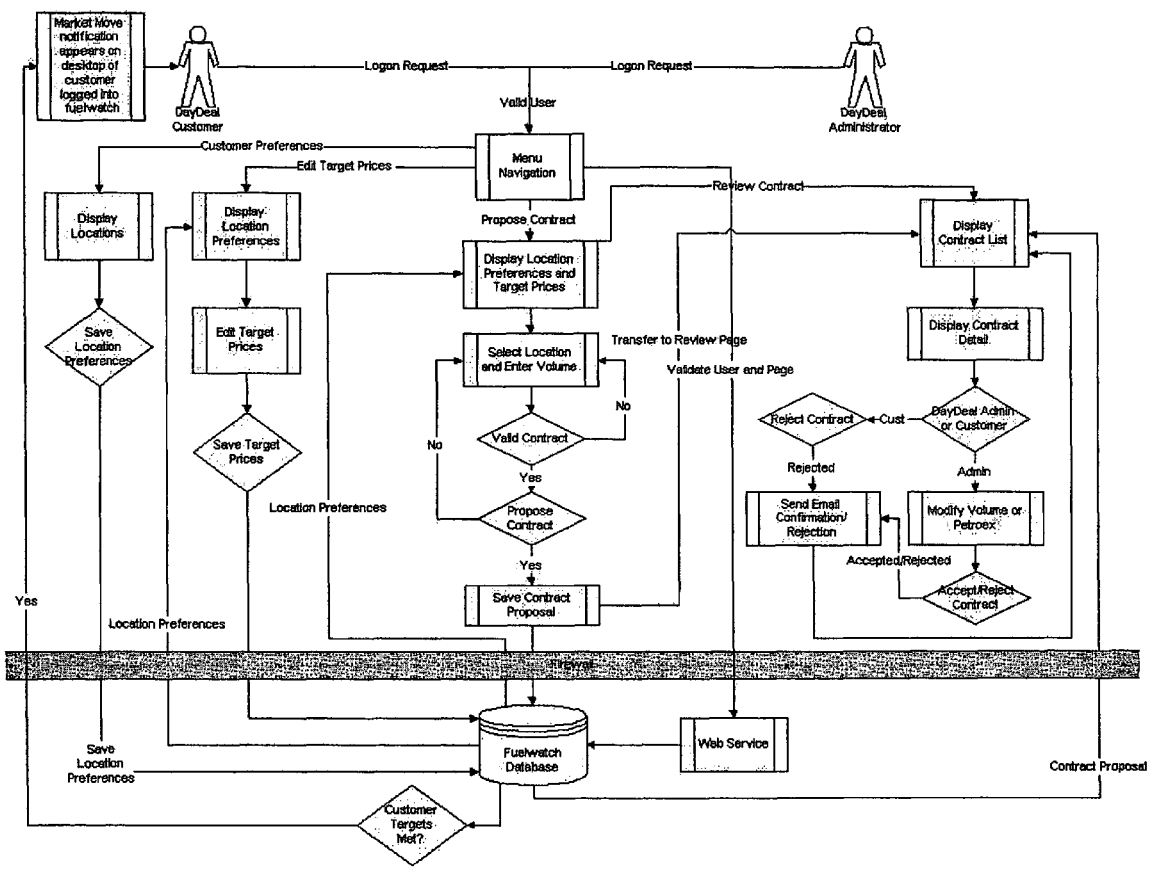
FIG. 1 is a flow chart diagram of a preferred method.

A preferred embodiment of the disclosure is described, in which petroleum fuels are marketed in an online system called the Day Deal system. A flow chart diagram of the Day Deal system is shown in FIG. 1. A preferred system is directed to the marketing of petroleum fuels such as unleaded gasoline or diesel. A user may contract with the administrator to buy certain fuels from various locations, for which that user is an approved buyer, at an agreed price for each contract. The administrator provides a proposed price for each fuel at each location that is tied in real time to a benchmark price. The benchmark price is selected by the administrator and may be the price of a futures contract on a chosen commodity exchange, such as the New York Mercantile Exchange (NYMEX), for example. A user may set a target price, and request notification if the administrator's price hits the user's target price, or a specified limit above or below the user's target price. When a user is notified that his target price is "in the money," or anytime during the trading day, he or she can submit a proposed contract, which is then accepted or rejected by the administrator.

In preferred embodiments, a new day deal user receives a URL address for the day deal site, a user ID and a password. This allows the user to login to the site through an internet connection, for example. In certain embodiments, a user may be a single individual that represents a customer or buyer, or a customer may include multiple users within a single company. The term "user" as used herein, therefore, may include single or multiple users within a single company.

Figure 2:
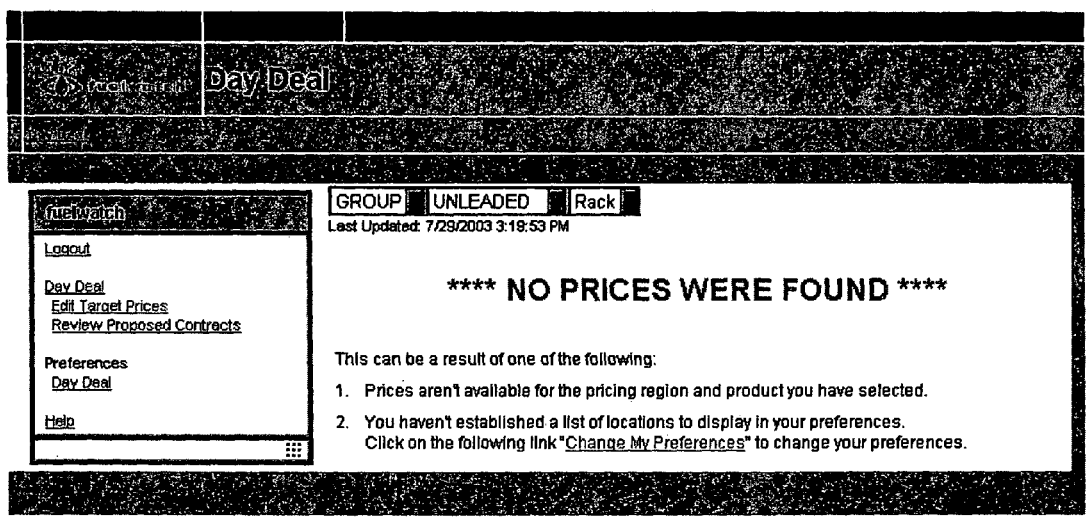
FIG. 2 is an example of a first screen for a new user in a preferred embodiment.

When a user logs in, no prices will be displayed until the user has entered and saved a set of preferences. An example of an initial screen is shown in FIG. 2. Preferably, a link is provided indicating "Change My Preferences" or a pull down menu may be provided in which preferences may be entered. In setting the preferences, the user can choose which terminals or locations to display on the day deal screen for each product. Each user can also chose to have different terminals for each product or the same list of delivery terminals for different products, such as both gasoline and fuel. In certain embodiments, if the user's price values are met, the browser may open and present a display like an e-mail meeting request notifying the user of a buying opportunity. This feature preferably can also be easily turned off.

Figure 5:
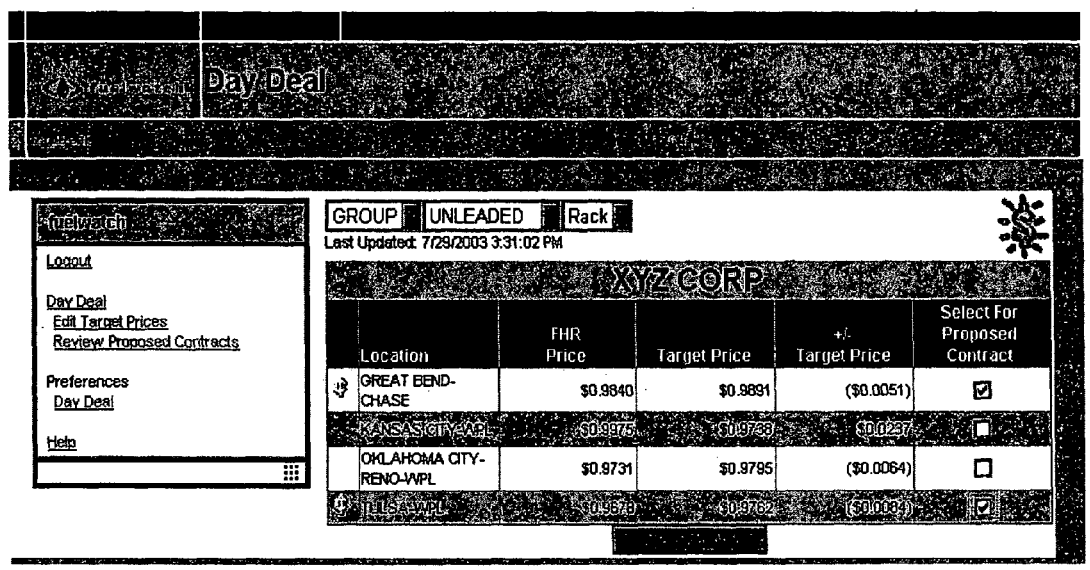
FIG. 5 is an example of a screen for monitoring prices in a preferred embodiment.

In preferred embodiments, users only have to set their preferences once, unless they wish to change them. Each time a user logs in to the system, the first screen displayed is that user's customized day deal screen. A typical screen is shown in FIG. 5. The screen contains the selected product and the locations that have been selected by the user for that product in the user's preference profile. The screen contains tick boxes associated with each location. The tick box allows the user to indicate which locations are to be selected by the use to propose a contract.

In certain preferred embodiments, the set preferences screen (FIG. 3) also allows a user to set the limits above and below the target price at which the user wishes to be notified. A global selection can be used to set limits above and/or below the target price for all selected sites, or individual upper and lower limits can also be indicated for each individual site. Target prices are preferably set for each location in a separate screen such as the one shown in FIG. 4. On a typical business day, a user would login and set target values for each product and at each location at which they are interested in monitoring. The target values can be adjusted throughout the day as market conditions change. If the value in the +/− Target Price column matches the parameters set in the user's preferences, the user is alerted that their target price is "in the money" and which location(s) meet their price criteria.

There are two purposes to the preference screen. The first is to determine which locations the user will see on their day deal screen. The preferences are based on product so it is possible to have a different set of locations displayed for different products, such as unleaded gasoline and heating oil, for example. Preferences are user based, so one user can watch one set of locations and another user of the same customer company can watch another set of locations. Users select "show" next to the locations they wish to display. At the bottom of the location list there is a "select all" option. To save the options, the user preferably selects the "Save Preferences" button at the bottom of the page or any changes to the screen will be lost.

Figure 3:
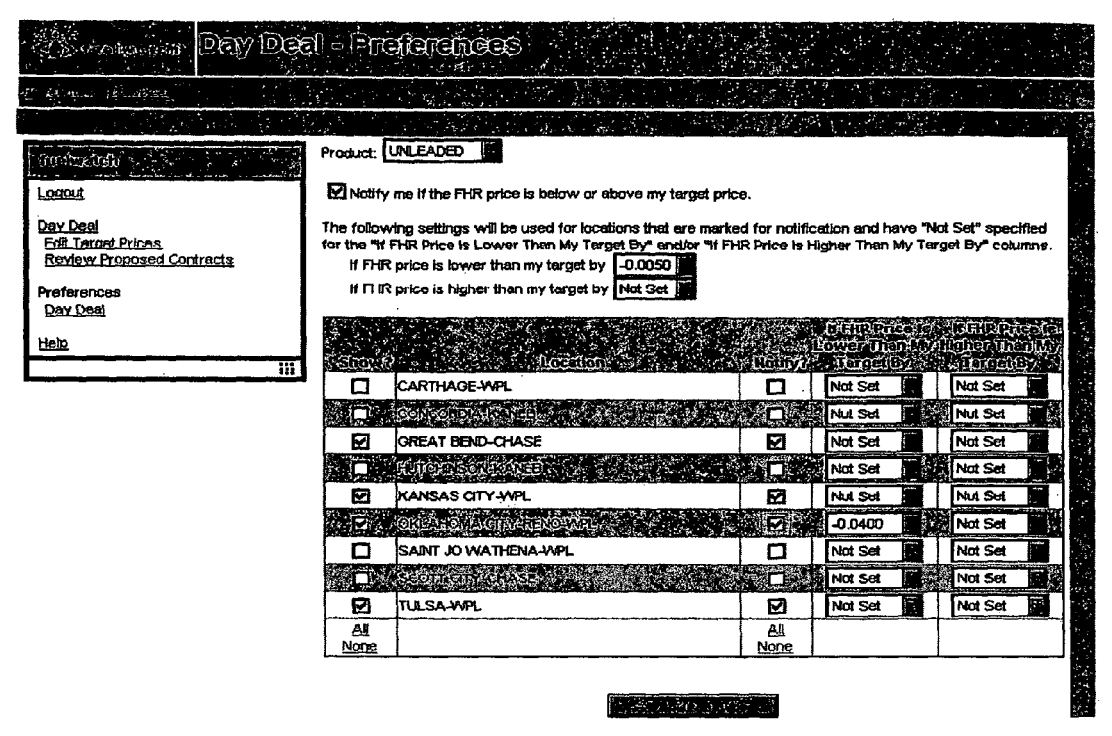

The second purpose of the preference screen is to set the price notification feature. The user can choose to set up notification at all terminals or at selected terminals. To use the notification feature the user checks the tick box as shown in FIG. 3 that indicates "Notify me if the FHR price is below or above my target price." Global values may then be set by entering a value in the window or windows shown after "Notify me if the FHR price is higher (lower) than my target by . . . ". The user can also set limit values for each individual terminal as shown in FIG. 3. If the notification is activated by a price move, the system will first look at the terminal. If there are no values for the terminal, it will look at the global values.

If the higher or lower values are left blank, the system does not alert the user. A user may, for example, leave the higher value empty and only receive notification if the lower criteria is met. The upper and lower values are used in conjunction with the target prices.

For example, a user may select the Hutchinson location and set the following parameters.

Hutchinson Low=−0.0025 High=0.0400

Administrator Price=0.9650

Target Price=0.9500

If the administrator's price moves down to 0.9475 or up to 0.9900 the user is notified.

In this example, if the Administrator's Price is 0.9900 or greater a $ symbol will flash in the upper right hand corner of the Day Deal Screen because the high notification criteria is met. In addition a cent symbol will appear next to the specific terminal(s) that meet the criteria. If the Administrator's Price is 0.9475 or less the $ symbol and cent symbol will flash because of the low notification. The alert will not occur if the price is between 0.9475 and 0.9900.

Figure 4:
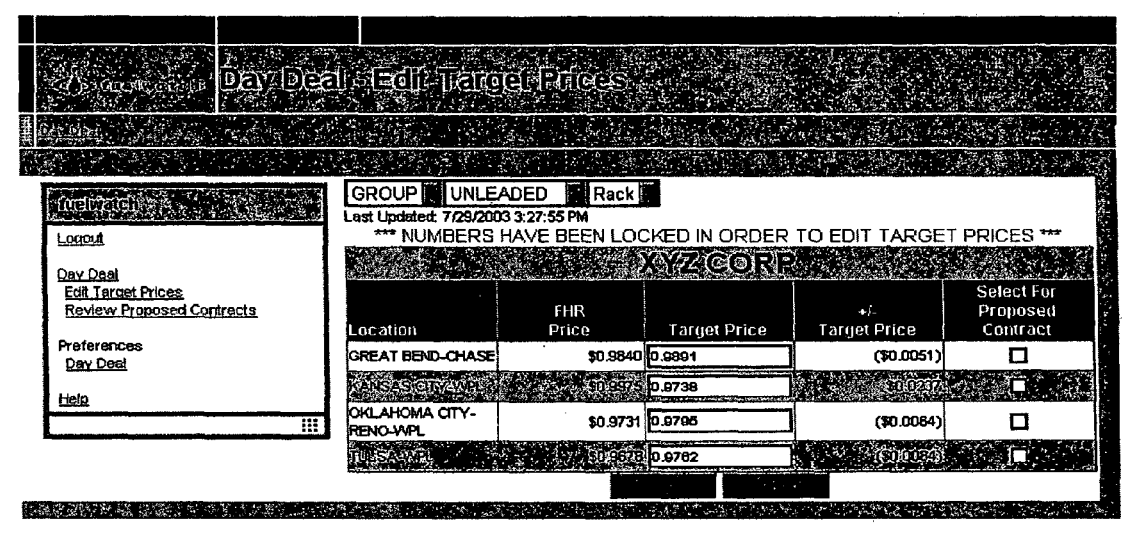

In preferred embodiments, target prices may be entered as follows. After preferences are saved, a user may click on the edit target prices item in the "Day Deal" menu located on the left-hand side of the screen shown in FIG. 3 to select edit target prices. An example of the target price screen is shown in FIG. 4. A user should check that all terminals appear. There are three pull down boxes at the top of the screen shown in FIG. 4. The first is pricing region, the second is product and the third is delivery method. All products and locations on a contract must have the same pricing region, base product and delivery method. The list of locations, product and prices depend on those three selections. If a user has clearances at terminals in multiple pricing regions they may use the pricing region pull down to select the locations located in another region. Target prices may then be added or edited in the target price column. In preferred embodiments, the administrator's price is updated at least once every two minutes during at least a portion of the trading day. It is understood, however, that this interval may be decreased to one minute, or even every 30 seconds, or it may be increased to every three, four or five minutes, or more, for example, if an administrator chooses to do so. It is an aspect of the disclosure, however, that the prices are updated throughout the trading day as the exchange price moves.

When the price is updated, the screen will refresh with new administrator's prices. During the updating process, user choices are grayed out so that information cannot be entered during the price updating procedure. However, during the time that the user is entering target prices the screen will not refresh, to make it easier to input the values. When finished, a user selects "save". It is also understood that users are not required to enter a target price. They may simply monitor the administrator's price during the day if they so choose.

During the trading day, the system compares the user's target price against the Administrator's price at each terminal as the prices move up or down. The Administrator's price may be updated in response to the real time price in a chosen market, such as the NYMEX. As such, the system provides live updates during hours when the chosen market is open. If the user has selected the Notify tick box for that product at that location, the system notifies the user when that terminal is "in the money," in order for the user to make a buying decision. The system may be open at other times during the day, either before or after the "live" market, with a fixed price offered to a user as determined by the administrator. If a user is monitoring more than one product, he or she may open multiple day deal windows in the internet browser and set each window to a different product. One can open as many windows as desired and have them set to different products and different pricing region locations. Preferably, an alert is produced for every appropriate browser window that a user has open.

Figure 6:
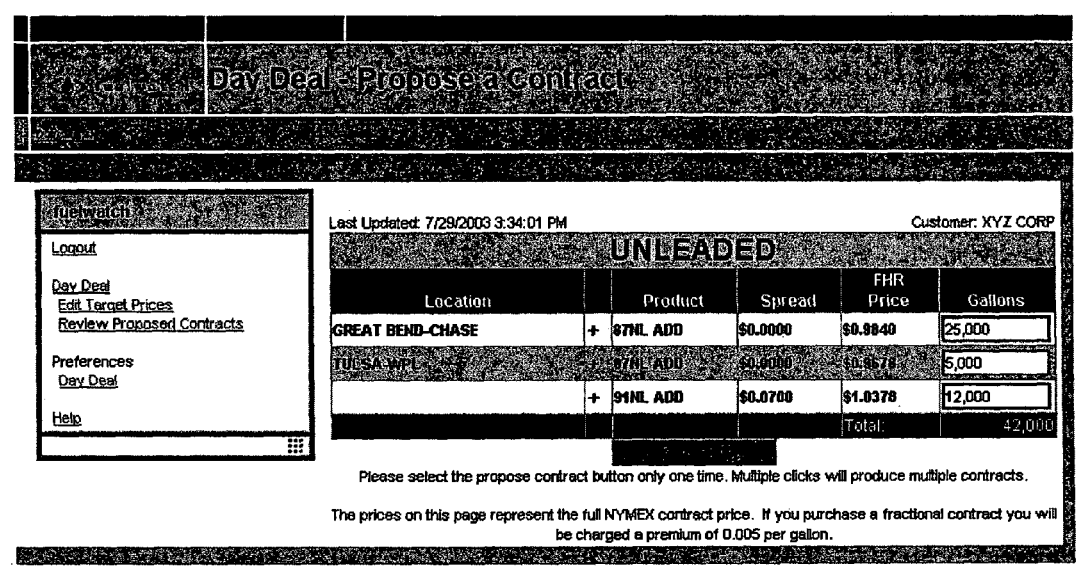

In a preferred embodiment, the user may refer to the main screen (FIG. 5) to monitor the Administrator's price versus the target price at each terminal. When the market presents an opportunity to purchase at the pre-set level the user has selected, the system will pop-up and show a flashing money sign. This notifies the user that they have at least one terminal "in the money". At that point, the user may enter a check mark in the right hand column tick box, "Select for Proposed Contract" for each terminal from which they may wish to take delivery of product. The user may then select the button "Enter Quantities" at the bottom of the page in order to continue to the screen shown in FIG. 6, to propose a contract.

At the "Propose a Contract" screen (FIG. 6), the user sees all of the base products. By clicking on the + symbol, the list of all available products and the amount of the price spread to the base product appears (product spreads are added to the base product price to determine the actual price of the various products offered at that location. Users can only enter volumes at base product level. The market continues to update on this screen. It is not necessary to enter volumes at every location selected, as long as the total amount meets the minimum for a contract. Users can, however, enter target volumes in order to speed up the process of entering a contract. When complete, the user selects the "Propose Contract" button. In a preferred embodiment, this button must be selected only once, or multiple contracts are produced.

After "Propose Contract" is selected, the user receives a query, "Do you wish to continue?" By clicking "Yes" the user will be taken to a review screen where all their proposed contracts are listed. Users can review the proposed contracts and may cancel them if the administrator has not already accepted the proposal.

In a preferred embodiment, within 30 minutes of the proposal, the Administrator reviews the proposal and either accepts or rejects the proposed contract. Confirmation of the acceptance, along with designated Petroex or similar order numbers are sent back to the user via the "DayDeal" screen and via e-mail. Once accepted, the contract volume and price are fixed and the user may begin lifting the product using the specific Petroex or similar order numbers for the contract.

In certain embodiments the present disclosure also includes a system for online marketing of commodity products to a plurality of users. The disclosed system includes several servers, including a web server, a database server and an applications server that may reside in one or more computers. The system further includes an electronic connection to a source of pricing information and to the computers of a plurality of users.

Figure 7:
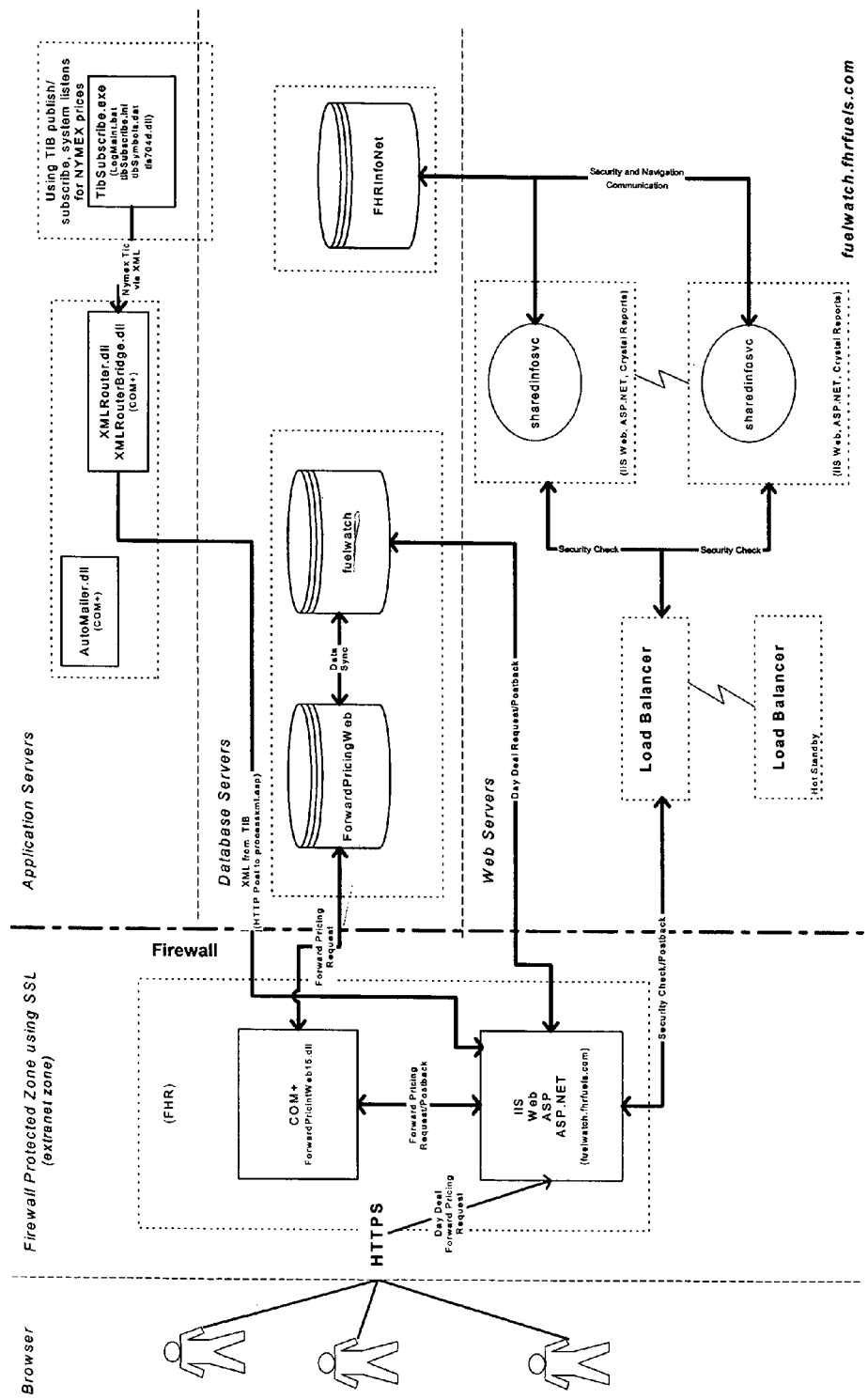
FIG. 7 is an example of a system for practicing preferred embodiments of the disclosure.

An embodiment of such a system is shown in FIG. 7. The system includes applications servers that contain a software program to receive live updated pricing information from a chosen exchange. In the example shown, the administrator subscribes to a commercial service that provides this data every thirty seconds in Extensible Markup Language (XML) format. The application servers are connected to the web servers as shown in FIG. 7. The web servers provide the secure connection to the users' computers and further provide the web pages that are seen by users when they are logged into the system. For example, a user's registration information may be entered in the web server or by the administrator and is saved on a database server in the FHRInfoNet database. The web server then accesses this data when a user attempts to log in thus ensuring that only qualified users have access to the system. The web servers also provide databases for the forward pricing web, which includes the user's preferences and targets for the trading session, and the fuelwatch database that contains the current updated pricing data.

The system further includes software that performs the steps of receiving the updated pricing, comparing the prices to the data stored in the forward pricing web, and sending the information to the automailer program in the application servers to notify users whose price criteria has been met.

In certain embodiments, the users connect to the web server through the world wide web, or internet, including wireless connections. It is also understood that other network connections may also be used including those known in the art and those to be developed. As such, the user's computer may be a desk top or portable computer, such as a laptop computer, a personal digital assistant, a telephone device or any other device that allows the user to interactively connect to the electronic interface.

All of the methods and systems disclosed and claimed herein can be executed by a person of ordinary skill in the art in light of the present disclosure. While the methods and systems of this invention have been described in terms of preferred embodiments, it will be apparent to those of skill in the art that variations may be applied to the systems and/or methods and in the steps or in the sequence of steps of the methods described herein without departing from the concept, spirit and scope of the invention.

The invention claimed is:

1. A method for electronic marketing of commodity products to a plurality of users comprising:
   providing an interactive electronic interface where each user can electronically communicate with an administrator's system and select any of one or more commodity products, locations for delivery for each selected product; and target prices for each product at each location;
   providing a database memory containing each user's selected preferences;
   providing an electronic link to the administrator's system from an active futures exchange to provide real time updates of futures contract prices for one or more commodity products;
   providing an administrator's price for each commodity being marketed, wherein the administrator's price is a sum of at least a pricing benchmark based on a current futures contract price and a basis price that is calculated for each product and delivery location, and further wherein the administrator's price is automatically updated as the futures contract price changes are received through the electronic link;
   displaying the current administrator's prices on the electronic interface for products and locations specified by a user;
   providing an electronic interface where a user can electronically propose a contract to buy an amount of the commodity product;
   accepting or rejecting the proposed contract; and
   electronically notifying the user of the acceptance or rejection of the contract.

2. The method of claim 1, further comprising providing an electronic interface where a user can set a preferred target price for a selected commodity and location, and further wherein the user can set a limit price above, below, or above and below the target price that triggers a notification of the user; said notification comprising providing an electronic notification to the user if the administrator price reaches a notification price limit specified by the user for a selected product.

3. The method of claim 1, wherein the commodity product is a petroleum product.

4. The method of claim 1, wherein the commodity product is a gasoline, or a distillate fuel.

5. The method of claim 1, wherein the commodity product is unleaded gasoline, diesel fuel, or heating oil.

6. The method of claim 1, further comprising providing administrator prices when the selected futures exchange is not actively trading.

7. The method of claim 1, wherein the commodity product is a petroleum product and the administrator's price is based on selected petroleum contract prices on the New York Mercantile Exchange.

8. The method of claim 7, wherein the administrator's price is updated at intervals of two minutes or less during at least a portion of the trading day in which the futures exchange is actively trading.

9. The method of claim 1, wherein the user is notified of the acceptance or rejection of the proposed contract by email, on the user's internet browser, or both.

10. The method of claim 1, wherein the administrator's price is updated at intervals of one minute or less during at least a portion of the trading day in which the futures exchange is actively trading.

11. The method of claim 1, wherein the administrator's price is updated at intervals of thirty seconds or less during at least a portion of the trading day in which the futures exchange is actively trading.

12. A method for a provider of petroleum products to electronically market the petroleum products to its customers comprising:
   providing an internet site where customers log in and view a price for a plurality of petroleum products deliverable at a plurality of locations and where customers can set target price criteria for selected petroleum products at selected delivery locations;
   providing a product price that is a sum of at least a basis price for each petroleum product for delivery to each location and the futures contract price for that petroleum product at an open futures exchange, wherein the price is continuously updated automatically during at least a portion of the active trading of the product futures contract on the exchange; and
   electronically notifying a customer if the customer's target price criteria are met by the product price;
   wherein a customer can electronically submit a proposed contract for a petroleum product and is notified electronically if the proposed contract is accepted or rejected.

13. A system for online marketing of commodity products to a plurality of users comprising:
   an applications server,
   a web server;
   and a database server;
   wherein the applications server is electronically connected to a source of live pricing from a chosen commodity exchange to obtain updated benchmark prices for the commodity products,
   wherein the applications server is connected to the web server effective to communicate pricing information to users connected to the web server and to communicate to users via email or by signals generated on a user's web page;
   wherein the web server is connected to a database server; and
   wherein the database server comprises a forward pricing database comprising user pricing preferences, a fuel watch database comprising current pricing data, a user information database, and software means for comparing data in the current pricing database with data in the user pricing preference database and notifying users when there is a match;
   and further wherein the system comprises a firewall preventing unauthorized users to access the database servers.

* * * * *